July 18, 1933.  J. E. GREENAWALT  1,918,535
METHOD OF DISPOSING OF REFUSE MATTER
Filed June 3, 1931   2 Sheets-Sheet 2
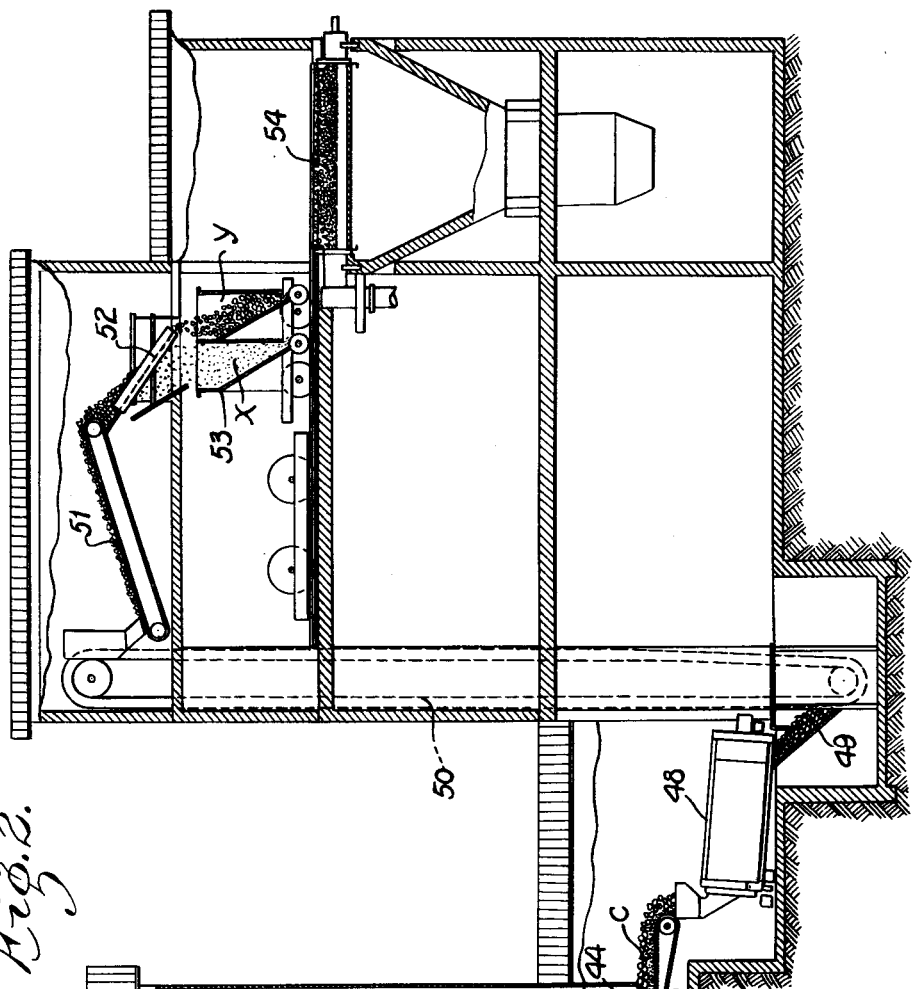
INVENTOR.
JOHN E. GREENAWALT.
By Harry␣␣␣
ATTORNEY Patented July 18, 1933

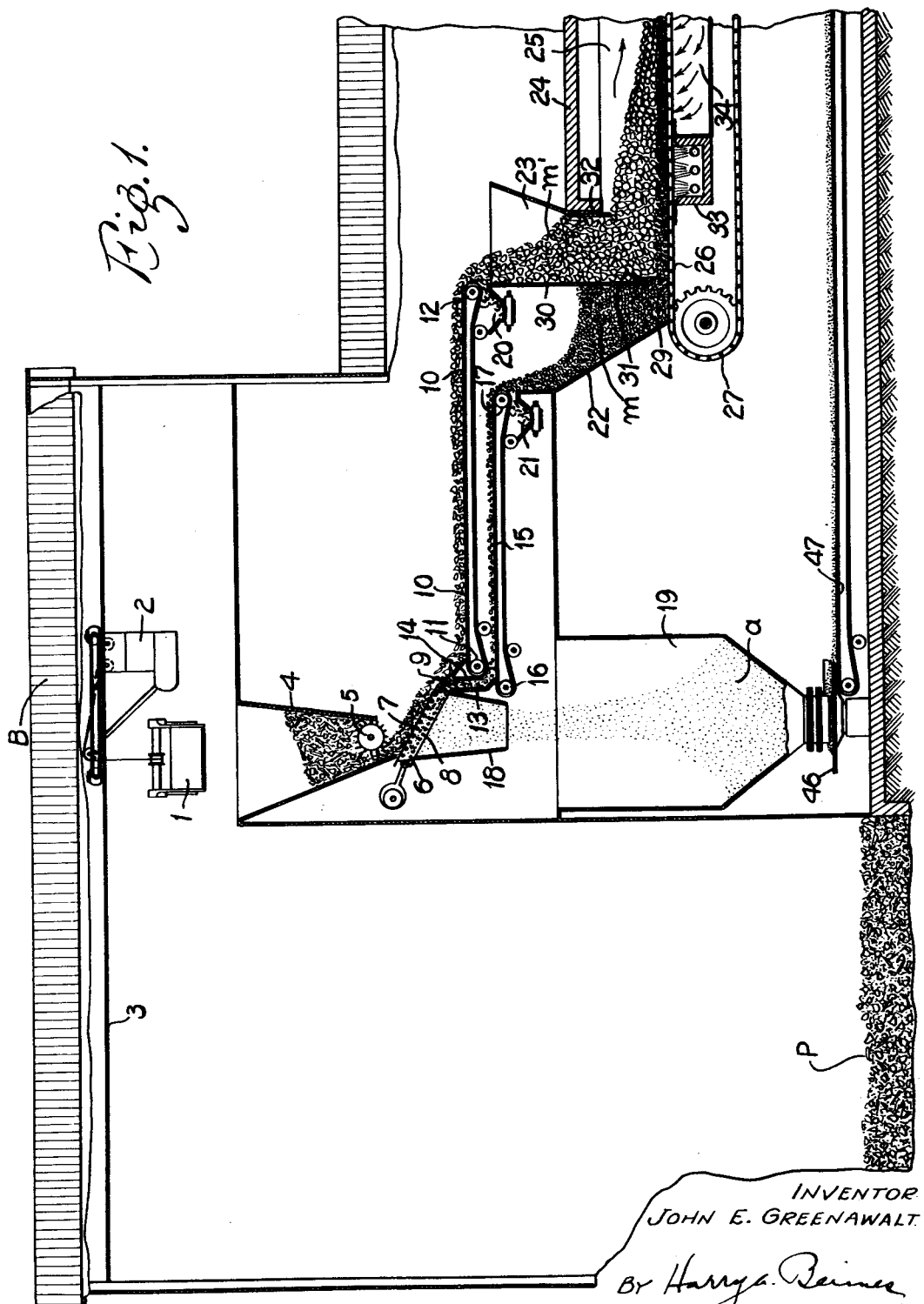

1,918,535

UNITED STATES PATENT OFFICE

JOHN E. GREENAWALT, OF NEW YORK, N. Y.

METHOD OF DISPOSING OF REFUSE MATTER

Application filed June 3, 1931. Serial No. 541,768.

My invention has relation to improvements in methods of disposing of refuse matter, more particularly municipal, city, or community refuse, and it consists in the novel manner of handling and treatment more fully set forth in the specification and pointed out in the claims.

Generally speaking, municipal refuse is made up of three components, viz., ashes, garbage and rubbish. In some instances these components are separately collected, and in other instances no attempt is made to separate these components. The present invention is particularly applicable to the disposal of commingled refuse.

Household ash forms a very large part of the refuse collected in cities for disposal and contains a large percentage of combustible matter (sometimes as much as 40%) in the form of unburned coal and carbon. This carbon is carried by the larger particles of ash, as the very fine dust is comparatively free from carbon. Therefore, if the fine dust is separated from the larger particles the combustible content of the ash is proportionately increased.

Garbage is essentially kitchen refuse and is composed principally of animal and vegetable matter which is also highly combustible after expelling the large quantity of water contained in the garbage.

Rubbish consists primarily of waste paper, paper and cardboard boxes, light wooden receptacles, bottles and cans. The greater proportion of the rubbish is extremely combustible and may very easily be disposed of by incineration after the large non-combustible elements, such as bottles and cans have been removed.

Suitable tests made on samples of these principal ingredients of municipal refuse show that the component of the ashes passing through a $\frac{3}{16}''$ screen contains 15% carbon, while the larger particles up to $2\frac{1}{2}''$ (especially from $\frac{3}{16}''$ to $1\frac{1}{2}''$) contain 50% carbon, and the calorimeter determinations have shown dry ash to contain 8,500 B. t. u. per lb. Dry garbage may have a heat value as much as 8,000 B. t. u. per lb., but the large quantity of water in the garbage as collected reduces this heating value to a low point. The calorific value of rubbish is also high— about 7,000 B. t. u. and rubbish is most generally very readily combustible and easily kindled.

From the foregoing it is apparent that mixed municipal refuse, just as it is collected, contains large quantities of combustible material and available heat units, although the large amount of water present in the garbage makes incineration of the refuse more difficult, and under present incineration methods requires the addition of extraneous fuel.

The manner of collecting refuse matter in cities depends largely on the method of disposal of the refuse, and in many cities collecting of the ashes, garbage and rubbish is carried on separately, while in other communities garbage, ashes and rubbish are gathered up collectively and do not exist as separate and distinct classes of city waste. Obviously, the collection of refuse as "mixed refuse" is highly desirable from an economic and sanitary point of view, and it is one of the objects of the present invention to provide an effective method of disposing of municipal refuse in a mixed condition.

Among the other objects of the invention are the following: disposal of all kinds of city waste by incineration in a sanitary and economical manner and the recover of the energy in the combustible material; to effect such incineration as a continuous process without the addition of extraneous fuel; recovering the clinker produced in the incineration for subsequent treatment; the production of a clinker that may be sintered to produce a light-weight, porous product suitable as an aggregate for concrete, building blocks, etc.; to effect a continuous discharge of the clinker without handling the same and without exposing the incinerating furnace to the cooling effect of outside air currents; the control of the furnace atmosphere to effect combustion to the extent necessary for preserving a desirable carbon content in the clinker to facilitate subsequent sintering thereof; to maintain a zone of extremely high furnace temperature near the gas exit of the furnace to insure complete combustion and purification of the gases before leaving the furnace.

The manner of accomplishing the above objects, together with other advantages of my improved method will be better apparent from a detailed description of the invention in connection with the accompanying drawings in which:

Figures 1 and 2 together represent a vertical longitudinal section of a plant layout showing the various steps in the treating process from the time the mixed refuse is delivered to the plant to the final product produced in the treatment of said refuse; Fig. 1 is the left hand part of the layout and Fig. 2 the right hand part.

Referring to the drawings, B represents a building in which the various apparatus employed in my improved process are housed. At one end of the building there is a receiving pit P in which the refuse, including ashes, garbage and rubbish is dumped from the collecting wagons, from which pit the garbage is hoisted by means of a grab bucket 1 and hoist 2 arranged to travel on the rail 3 above the pit and above the feed hopper 4. The grab bucket 1 is operated to dump the refuse into the feed hopper 4 from which the discharge of refuse is controlled by means of a feed roller 5 so as to be fed onto the inclined vibrating screen 6. The vibrating screen 6 has two screen elements 7 and 8 in superposed relation, the upper screen element 7 having approximately 1½" openings, while the element 8 has approximately $\frac{3}{16}$" openings. Thus, all of the material leaving the feed hopper 4 of a size larger than 1½" will discharge over the screen element 7 and over the apron 9 onto a picking belt 10 mounted on pulleys 11 and 12. The material that passes through the screen 7, as explained above, will comprise the larger pieces in the ashes and coal and will pass over the screen 8 falling between baffles 13 and 14 onto a belt conveyor 15 mounted on pulleys 16 and 17. Vibrating screen 6 has a chute 18 projecting downwardly from it and the fine ash that passes through the screen 8 will drop through the chute 18 into the "fines" hopper 19 therebelow. The pulleys 12 and 17 are each magnetic so that pieces of metal will be separated from the other material discharging over the ends of belts 10 and 15 and these metallic particles will be dropped onto belt conveyors 20 and 21 respectively to be carried away as they are not wanted in the incinerator. In the material discharged onto the upper picking belt 10 will be found practically all the paper, cardboard boxes, large pieces of garbage, rags, tin cans, glass, etc. ranging in size from 1½" up. It is apparent that this material could not readily be arranged in a uniform layer. During the travel of the material over the belt 10, the bottles, glass, and other objectionable articles will be removed by "pickers" as is now commonly practised in incinerating plants, while the smaller metallic substances, as pointed out, will be removed by the magnetic pulley 12 and conveyed away on the conveyor 20. The material that is discharged from the screen 8 onto the lower conveyor 15 will principally comprise unburned coal, larger particles of ash and the smaller particles of garbage and some of the finer material. This material, the size of the particles of which are confined between more or less definite limits (between $\frac{3}{16}$" and 1½") can be arranged in a substantially uniform layer or bed through which a flow of air can be maintained. Having separated the refuse into two components according to size it is the purpose of this invention to arrange the components on a traveling grate with the smaller and more compact component serving as a bed for the component of larger, more loosely arranged particles. For this purpose I have provided adjacent charging hoppers 22 and 23, the former being disposed to receive the material discharged from the belt conveyor 15 and the latter being disposed to receive the material discharged from the picking belt 10. A furnace 24, somewhat similar to a reverberatory furnace having a combustion chamber 25 of considerable length, is provided adjacent the hoppers 22 and 23 and has a traveling grate 26 mounted on suitable sprocket wheels 27, 28, the former extending somewhat forward of hopper 22 and the latter extending beyond the rear end of the furnace which carries a stack 29' for the discharge of the gaseous products of combustion. The traveling grate 26 thus extends under the combustion chamber 25 of the furnace and also under the hoppers 22 and 23, the hoppers opening onto the grate so that as the grate moves under the hopper 22 it will receive a charge of material from the hopper 22 which has an outlet opening 29 in its rear wall 30 immediately above the grate. The size of this opening 29 may be controlled by a gate 31 in order to regulate the quantity of material discharged from the hopper 22 onto the grate. As the grate 26 moves under the hopper 22 the material therein will be carried out of the hopper so as to form a layer on the grate which layer of material then travels beneath the open bottom hopper 23 and receives on it a charge of the larger pieces of refuse $m'$ from the hopper 23. The quantity of material $m'$ that is allowed to discharge from the hopper 23 onto the layer of material $m$ may be controlled by an adjustable gate 32 in the rear wall of hopper 23. As soon as the material $m$ and $m'$ is carried into the combustion chamber 25 of the furnace 24 it moves over an igniter 33 which is in the form of a box fitting closely beneath the traveling grate 26, said box being arranged to be filled with flame under pressure of an air blast so as to force the flame against and into the lower surface of the charge of material m. The intense heat of the igniter thus ignites the charge of material and as the grate 26 moves away from the igniter this material comes under the influence of an air-box 34 which extends from the igniter to the rear end of the combustion chamber 25. A suitable fan 35 has its outlet connected to the air-box by a conduit 36 so as to maintain considerable air pressure within the air-box that at all times there will be a strong draft passing upwardly through the grate and, of course, through the charge of material thereon. The material that just emerges from the influence of the igniter is immediately subject to the strong draft of the air-box and the material fanned into active combustion, and this active zone of combustion will gradually propagate itself upward through the entire layer of material. Of course the combustion is not immediately rapid on account of the moisture that is present in the garbage of the refuse, but as the charge of material moves further into the combustion chamber 25, and the burning zone after ignition moves upward, the moisture becomes gradually less and combustion increasingly more rapid. Obviously, the layer of larger, bulkier particles that are discharged into the incinerator furnace 24 from the hopper 23 will be ignited at the top almost immediately by the heat from the combustion chamber, and at the bottom somewhat later by the upward moving burning zone in the layer of smaller material, and they, too, will burn with increased rapidity as they are carried further into the combustion chamber 25. By the time the charge of material has been carried by the grate 26 to near the rear end of the combustion chamber 25, combustion will be so intense and the temperature so great that all volatile and combustible gases released by the material near the entrance of the combustion chamber will be completely consumed and oxidized; that is, the gases driven off from the material at the beginning of the incinerating action will travel through the combustion chamber until they get into this zone of intense combustion where they will be completely oxidized and contribute their heat units to increase the temperature of this part of the furnace.

The intense heat created by the strong blast of air will, in the presence of carbon, decompose the steam and water vapor in the air current into hydrogen and carbon monoxide, thus:

$$H_2O + 2C + O = 2CO + 2H$$

The hydrogen and carbon monoxide thus formed will in turn burn in this intensely hot zone of the combustion chamber, still further improving the thermal efficiency of the furnace.

The rear furnace wall 37 is provided with an opening 38 through which the grate 26 with its superincumbent incinerated material passes, the width of said opening being controlled by means of a gate 39. At the time the material leaves the combustion chamber 25 it is completely incinerated and reduced to the form of a clinker and has traveled beyond the influence of the draft from the air-box 34 into clinker receiving hopper 40. As the grate sections travel around the sprocket 28 the cake of clinker will be broken and the clinker will discharge as lumps into said hopper 40. Owing to the friability of the clinker cake (which is controlled by regulating the completeness of the oxidation of the incinerated material) there will be considerable breaking up of the clinker as it is discharged into the hopper. However, should the disintegration of the clinker not be sufficient to enable the subsequent handling thereof, a suitable crusher may be inserted in the lower end of hopper 40 or between said hopper and belt conveyor 47 referred to hereinafter. A water spray nozzle 41 leading from a suitable source of water supply is positioned within the hopper 40 for spraying the hot clinker and reducing the temperature thereof, said temperature being further reduced by the fan 35 which has its intake connected into the bottom of hopper 40 by means of a conduit 42. A reciprocating feeder 43 of any satisfactory type is disposed adjacent to the open bottom of hopper 40 to control the discharge of the disintegrated clinker c from the opening 44, the width of the discharge opening being regulated by means of a perforated gate 45 disposed over the opening 44. The gate 45 is perforated to permit a flow of atmospheric air through the lower part of the accumulated clinker in the hopper under the influence of the fan 35.

It is apparent that the speed with which the traveling grate 26 moves through the furnace 24 and also the volume of the air blast forced through the combustion chamber 25 may be controlled. The more slowly the material travels through the furnace and the larger the volume of air provided for combustion, the more complete said combustion will be, so that it is possible to obtain a clinker as a final product of incineration that will contain practically no carbonaceous matter. However, it is not desirable to carry combustion to this extent as a certain quantity of carbon is desirable in the clinker product for subsequent treatment, and excessive fusing of the clinker is to be avoided because such a clinker will not disintegrate readily. On the other hand, if the volume of air and speed of grate travel is controlled so as to effect the discharge from the furnace before oxidation is complete, a clinker is obtained having desirable physical properties, such as friability, and having the proper chemical composition including a certain carbon content, whereby it is in ideal condition for the sintering operation that is to follow. I have found that when this clinker or cinder contains about 18% carbon it is very satisfactory to mix with the fine ash for the production of light-weight aggregate for concrete.

The type of igniter 33 that is used to ignite the charge as it enters the furnace is not a matter of importance beyond being capable of effecting complete ignition across the charge. I may avail myself of a blow-torch igniter which will project tongues of flame upwardly through the grate entirely across the charge. Other details of construction of the apparatus need not be rigidly adhered to, as the present invention broadly contemplates the generic method of disposing of refuse herein disclosed.

While the process thus far described is complete in itself, I propose to carry the process further and produce from the clinker resulting from the incinerating of the refuse matter a commercial product suitable for use as an aggregate in concrete or in the manufacture of building blocks. This aggregate is produced by sintering the clinker $c$ either alone or as a mixture with other ingredients. One such mixture that may be used comprises the clinker $c$ and the fine ash that has been initially separated from the mixed refuse and received in the hopper 19. The ash $a$ may be discharged from the hopper by means of a table feeder 46, such as shown in pending application Ser. No. 520,885, filed March 7, 1931, or equally suitable design, said feeder operating to feed the ash in a measured quantity onto the belt conveyor 47. The belt conveyor travels beneath the hopper 40 and also receives the disintegrated clinker $c$ from the feeder 43, or crusher. The clinker $c$ and ash $a$ are thus conveyed together with the fines from the sintered material by the belt 47 to a mixer 48 which discharges the mixture into elevator hopper 49 whence elevator 50 carries the material up to conveyor 51 which discharges onto vibrating screen 52. Screen 52 separates the more finely divided particles into compartment $x$ of the charge car 53 and the coarser particles into the compartment $y$ thereof. The charge car then deposits these components of the material in layers in the sintering pan 54 where the sintering operation is performed according to present well-established practise. The sintering produces a porous aggregate that is ideally suited on account of its physical and chemical characteristics as an aggregate for concrete and in the manufacture of concrete blocks or tile.

The cinder from the incinerator has been burned at high temperature and as this part of the charge contained considerable glass, earthenware, etc., the resulting clinker is considerably heavier than the unfused fine ash. On the other hand, it makes a much stronger sintered product. A mixture of one-fourth the crushed incinerator cinder with three-fourths by volume of the fine ash makes an excellent sintering charge with the proper amount of carbon to produce a well fused light-weight product. Such a material will weigh about 45 lbs. per cubic foot when crushed and sized ready for mixture with cement for the manufacture of light-weight concrete having great strength. When fine ash is sintered by itself a product can be produced that will weigh about 35 lbs. per cubic foot but concrete made with it will not be so strong.

In the manufacture of light-weight concrete aggregate from ashes or cinders without the admixture of other material it is most important to have the proper amount of carbon for sintering. If it is too low in carbon the product will be fragile; if too high, the excess fuel interferes with the production of a material having lightness and the necessary strength. The removal of the fine ash below $\frac{1}{8}''$ has given excellent results, but I do not wish to limit my invention to this size. If the material is low in carbon this size must be increased. The essential idea is to make this separation at a point where the resulting product will have the best amount of carbon for the sintering process.

Having described my invention, I claim:

1. The method of disposing of combustible refuse matter which consists in separating the matter into at least two components according to uniformity of combustibility, charging said components in layers on an air pervious support, igniting said charge at the surface having the greatest uniformity of combustibility, and causing a supporter of combustion to traverse the charge from the ignited surface to the opposite surface whereby combustion proceeds throughout the charge.

2. The method of disposing of combustible refuse matter which consists in separating therefrom a component consisting in particles of graded size, arranging said component as a bed on an air pervious support, arranging the bulkier material of the refuse matter on said bed, causing said bed to move through a suitable combustion chamber, causing flaming particles and highly heated products of combustion to penetrate the bottom surface of said bed and causing a supporter of combustion to pass upwardly through the bed into the combustion chamber as the bed travels therethrough.

3. The method of disposing of moist combustible refuse matter which comprises separating the material into a plurality of components according to size, feeding said material in layers onto an air pervious support in its original moist condition with the densest layer at the bottom, applying highly heated particles against the bottom surface of said bottom layer to effect ignition thereof, passing air upwardly through the layers to propagate combustion and produce a clinker, and discharging said clinker from the support.

4. A method of disposing of combustible refuse matter which consists in separating from the material a component of particles of predetermined size, depositing said component as a layer on a perforated support, depositing the larger sized particles of material on said layer, causing flaming gases and highly heated products of combustion to penetrate the bottom surface of the layer to ignite the same, and thereafter passing air through the layer to propagate combustion through the charge, and completing oxidation of the combustible gases in a suitable combustion chamber.

5. The method of disposing of combustible refuse matter which consists in separating the matter into at least two components according to their uniformity of combustibility, depositing the components having the greatest uniformity of combustion in a layer upon a perforated support and depositing upon this layer the component having the least uniformity of combustion, igniting the bottom of the layer having the greatest uniformity of combustion, and causing the zone of combustion to propagate itself upwardly throughout the charge.

6. The method of disposing of mixed combustible refuse matter which consists in separating from the mixed matter a component of the material suitable for forming a comparatively homogeneous layer, charging said layer on an air pervious support, charging the remainder of the matter on said homogeneous layer, igniting said homogeneous layer at its bottom surface, and causing a supporter of combustion to traverse the charge from the ignited surface to the opposite surface whereby combustion proceeds throughout the charge.

JOHN E. GREENAWALT.